(No Model.)

J. E. FISHER.
AXLE.

No. 512,246. Patented Jan. 2, 1894.

Witnesses
D. E. Kempster
Anna M. Dolloff

Inventor
John E. Fisher
by Henry Chadbourn
his Atty.

THE NATIONAL LITHOGRAPHING COMPANY,
WASHINGTON, D. C.

UNITED STATES PATENT OFFICE.

JOHN E. FISHER, OF BOSTON, MASSACHUSETTS, ASSIGNOR TO THE FISHER AXLE COMPANY, OF SAME PLACE.

AXLE.

SPECIFICATION forming part of Letters Patent No. 512,246, dated January 2, 1894.

Application filed April 3, 1893. Serial No. 468,820. (No model.)

*To all whom it may concern:*

Be it known that I, JOHN E. FISHER, a citizen of the United States, residing at Boston, in the county of Suffolk and Commonwealth of Massachusetts, have invented certain new and useful Improvements in Axles; and I do hereby declare the following to be a full, clear, and exact description of my invention, such as will enable others skilled in the art to which it appertains to make and use the same.

This invention relates to improvements in that class of axles which are provided on their inner and outer ends with conical portions which are adjustable toward each other in order to take up the wear of the boxes and axles, thus preventing the rattling noise caused by the looseness of the boxes on the axles.

The object of my invention is to provide means to securely fasten the parts after they have been properly adjusted and to provide packings to effectually prevent the escape of grease or oil from the joint between the box and axle.

The invention is carried out as follows, reference being had to the accompanying drawings, whereon—

Figure 1:
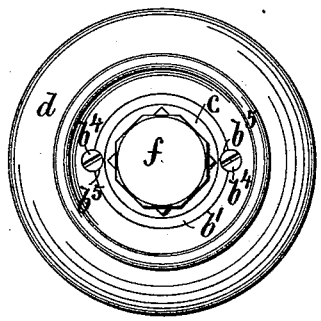
Figure 2:
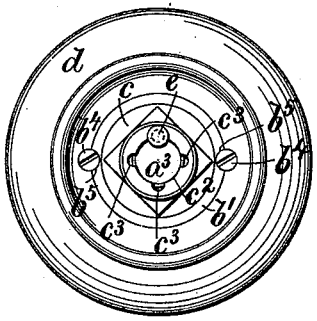
Figure 3:
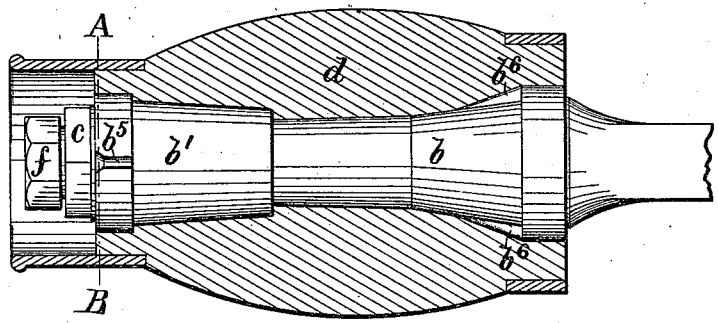
Figure 4:
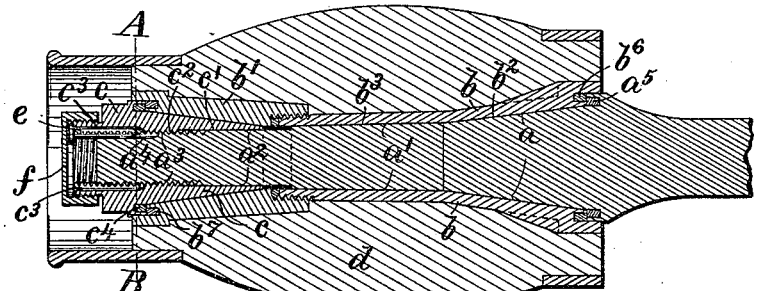
Figures 6, 7:
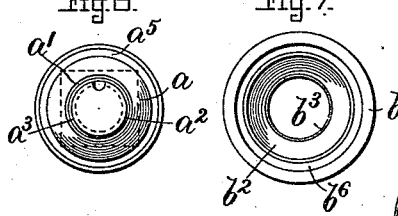
Figure 5:
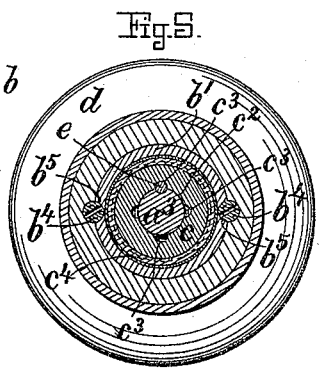
Figures 8, 9:
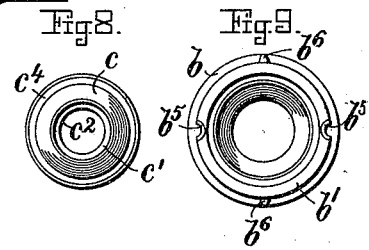

Figure 1 represents a front view of a hub of a wheel and my improved axle and box complete. Fig. 2 represents a similar view of the same, with the outer cap of the axle removed. Fig. 3 represents a side elevation of the complete axle and box, with the hub shown in longitudinal section. Fig. 4 represents a central, vertical longitudinal section of the hub, axle and box. Fig. 5 represents a cross section on the line A B shown in Figs. 3 and 4. Fig. 6 represents a front elevation of the axle proper with the box and outer conical bearings removed from the same. Fig. 7 represents a view of the box alone, as seen from the inner end thereof. Fig. 8 represents a view of the outer conical bearing removed from the axle and hub, as seen from the inner end thereof. Fig. 9 represents an end view of the box alone, as seen from the outer end thereof.

Similar letters of reference refer to similar parts on the different parts of the drawings.

The spindle of the axle consists of the conical inner part $a$, the slightly tapering part $a'$, the smooth cylindrical part $a^2$, and the screw threaded outer part $a^3$, substantially as shown in Fig. 4.

The box is made in two perforated pieces, $b$ and $b'$, screw threaded and screwed together, substantially as shown, the perforations in the part $b$ being provided with the inner conical surface $b^2$ which closely fits upon the conical portion $a$ of the axle and also with the slightly tapering surface $b^3$ which fits upon the part $a'$ of the axle, as shown. The part $b'$ of the box is made with a conical perforation to receive and to fit upon the outer surface of the perforated conical sleeve or nut $c$. The perforation in the sleeve or nut $c$ is made with the smooth cylindrical surface $c'$ which closely fits and slides upon the cylindrical part $a^2$ of the axle and also with the screw threaded part $c^2$ which is screwed upon the screw threaded part $a^3$ of the axle in order to adjust the sleeve upon the axle, for a purpose to be described hereinafter.

The sleeve $c$ forms the nut to hold the wheel upon the axle, and axles now in common use are provided with nuts screw-threaded their entire length and are very liable to break at the inner end of the nut on account of the thread cut on the axle weakening the same, but when the perforation is provided with a smooth cylindrical portion fitting on a corresponding cylindrical portion of the axle, as is the case with the sleeve $c$, the axle is strengthened, and the liability of breakage at the threaded portion is obviated.

The outer surfaces of the parts $b$ and $b'$ of the box are made to correspond with the perforations through them, and consequently the shell of the box is of approximately even thickness throughout. By constructing the box of the two pieces and screwing them together as shown the box is inserted within the perforation in the hub $d$ from opposite ends thereof, and by removal of as little of the hub as is possible, consequently weakening the same but slightly and allowing the greatest amount of stock into which to insert the inner ends of the spokes. The hub $d$ being provided with a perforation which fits the outer conical surfaces of the two parts of the box, permits any looseness of the box within the perforation in the hub to be taken up by screwing the two parts $b$ and $b'$ more closely together, as will be easily understood.

After the parts $b$ $b'$ of the box have been properly inserted within the hub and firmly adjusted therein, they are prevented from working loose by the screws $b^4$ $b^4$ screwed into the hub and resting in the side grooves $b^5$ $b^5$ on the part $b'$ of the box in connection with the ribs $b^6$ $b^6$ on the part $b$, which ribs enter the wood of the hub and prevent the part $b$ from turning in the perforation in the hub, the screws $b^4$ $b^4$ preventing the part $b'$ from turning in said perforation. It will be seen that should the box become loose in the perforation in the hub and it is desired to tighten it again, it is only necessary to remove the screws $b^4$ $b^4$, and to screw the parts $b$ $b'$ more closely together by means of a suitable wrench inserted in the side grooves $b^5$ $b^5$ and afterward to insert the screws $b^4$ $b^4$ in their places again. This taking up of the looseness between the box and the hub, dispenses with the use of wedges, bushings, &c., as is common with boxes now in common use.

It is not essential to the spirit of my invention that the parts $b$ and $b'$ should screw one upon the other, as shown upon the drawings, as said parts might be provided with exterior screw threads, adapted to be screwed into the wood of the hub, said parts telescoping and sliding one upon the other when adjusted within the hub in inserting them and in taking up the wear of the box in its perforation.

The sleeve $c$ is screwed upon the screw threaded end of the axle in order to hold the hub and its attached box in its position upon the axle and to cause the wheel to run true said sleeve is made adjustable upon the axle in order to take up any wear or loose motion between the axle and the box. This sleeve is adjusted upon the axle by means of a suitable wrench and is locked in its adjusted position by means of the pin $e$ which is inserted within the groove $a^4$ extending longitudinally along the screw threaded portion $a^3$ of the axle, and one of the series of longitudinal grooves $c^3$ $c^3$ on the screw threaded part $c^2$ which coincides with the groove $a^4$, as shown in Figs. 2, 4 and 5. This pin effectually prevents the sleeve from turning on the axle when it is in its position as shown on the drawings. Should the box become loose upon the axle from wear or from any other cause, it is only necessary to remove the pin $e$ and to turn the sleeve $c$ upon the axle, until it is sufficiently tight, and until one of the grooves $c^3$ coincides with the groove $a^4$, then to insert the pin $e$ to lock the sleeve in that position. The pin $e$ is held within the grooves in the sleeve and the axle by means of the cap nut $f$, which is screwed upon a screw-threaded projection on the sleeve $c$ substantially as shown. This cap-nut gives the exposed portion of the axle a neat appearance, and excludes dirt from the screw threads in the sleeve $c$.

The various parts of the axle are so arranged that the sleeve can be adjusted upon it to take up the wear or loose motion between it and the box at any time.

It has been the common practice to place washers made of leather, rawhide, rubber or other hard and wear-resisting material upon the inner end of the axle, between the collar thereon and the inner end of the box or a shoulder formed in the box and also upon the outer screw-threaded end of the axle, between the outer ends of the box and the nuts which hold the wheels upon the axle to take up and prevent the wear of the box and axle. These washers have to be made of hard material to resist wear, and it has been discovered that when the box is moved suddenly lengthwise on the axle, as is often the case while a wheel is traveling over the ground, no matter how slight the movement may be, it has caused the oil or grease which has worked up from the axle and rests upon the abutting surfaces of the washer and box or between the washer collar and box or the washer nut and box, to be squeezed out from between said surfaces, thus giving the axle an uncleanly appearance, as well as tending to catch any dust or gravel that may come in contact with the grease and thereby causing said gravel to facilitate the wearing out of the axle. To obviate this difficulty I provide the collar which is on the inner end of my improved axle, with an annular groove at the junction of the collar and the axle, substantially as shown on the drawings, and place a packing $a^5$ of felt or other soft and flexible material within this groove, so that it will come in contact with the inner end of the box or with a countersunk shoulder in said end of the box. I also prefer to provide the surface of the inner end of the box, which comes against the said collar on the axle, with an annular groove, and place a packing $b^6$ of felt or other soft and flexible material within this groove, so that it will come in contact with the surface of the packing $a^5$ and the face of the collar on the axle. These grooves in the collar and the end of the box are preferably of such a size as to leave but a thin metal shell of the collar and box to retain the packings in their places. The packings $a^5$ and $b^6$ are made of such soft material that they yield when the box moves longitudinally on the axle, and prevent spurting the oil or grease from between their meeting surfaces as would be the case were said packing to be made of any hard material. This yielding of the packing causes the oil to be wiped back, and prevents it from working out by keeping it between the working surfaces on the box and axle. I also provide the collar of the conical sleeve $c$ at the junction of the collar and sleeve, with a groove, and place a soft packing, $c^4$ within said groove, substantially as shown and preferably the outer end of the box which comes against the collar on the sleeve is provided with an annular groove and soft packing $b^7$ as shown, similar to the packings $a^5$ and $b^6$ on the inner end of the axle, in order to prevent the escape of oil or grease at this place.

The use of the packings $b^6$ and $b^7$ is not absolutely necessary to effect the object desired, that is, to prevent the escape of oil or grease, and said packings when used alone, without the packings $a^5$ and $c^4$ would not accomplish this result, but the packings $b^6$ and $b^7$ are used to prevent dust or gravel from entering between the box and bearing, and cutting and wearing it out. The packings $a^5$ and $b^4$ may in some cases be used without the packings $b^6$ and $b^7$ and still prevent the escape of grease and oil, but I prefer to use both sets of packings, to work one with the other.

I do not wish to confine myself to the exact manner in which the packings $a^5$, $b^6$, $c^4$ and $b^7$ are arranged, in connection with the axle and its box, as there are many different ways in which said packings might be arranged, within the scope of mechanical skill, to accomplish the object of my invention, without departing from the spirit thereof.

By the use of the packings as herein described, I am able to use much lighter oils or grease in lubricating the axle, and the axles do not require to be lubricated so often as those now in common use. Furthermore, the axles are neater and cleaner, as none of the oil or grease is exposed to view, when the wheel is in running order.

Having thus fully described the nature, construction, and operation of my invention, I wish to secure by Letters Patent and claim—

1. A vehicle axle having a screw threaded portion at its outer end and a longitudinal groove on the said screw threaded portion, combined with an internally screw threaded sleeve adapted to be screwed upon the screw threaded portion of the axle to hold the wheel thereon; longitudinal groove or grooves upon the screw threaded portion of the sleeve which grooves coincide with the groove on the axle, in turn, as the sleeve is adjusted thereon, a pin to enter the grooves in the axle and sleeve to lock the sleeve in its adjusted positions to prevent a longitudinal or rotary movement of the sleeve, and a cap nut upon the sleeve to cover the joint between the sleeve and the axle and to hold the pin within the grooves, for the purpose set forth.

2. In a vehicle axle having an inner and an outer conical bearing, a box to fit said bearings and the outer bearing being adjustable to take up the wear of the axle, the collars on the bearings, the annular groove at the junction of each of the collars and bearings, and the soft flexible packings $a^5$ and $c^4$ inserted within said grooves to come in contact with the ends of the box, to prevent the escape of oil or grease from the joint, between the bearings and the box, for the purpose set forth.

3. In a vehicle axle having an inner and an outer conical bearing, a box to fit said bearings, and the outer bearing being adjustable to take up the wear of the axle, the collars on the bearings, the annular groove at the junction of each of the collars and bearings, and the soft flexible packings $a^5$ and $c^4$ inserted within said grooves, combined with the annular groove in each end of the box and the soft flexible packings $b^6$ and $b^7$ inserted within said grooves, the packings $a^5$ and $c^4$ to come in contact with the ends of the box, and the packings $b^6$ and $b^7$ to come in contact with the collars on the conical bearings to prevent the escape of oil or grease from the joint between the bearings and the box, for the purpose set forth.

In testimony whereof I have hereunto set my hand this 1st day of April, A. D. 1893.

JOHN E. FISHER.

Witnesses:
HENRY CHADBOURN,
D. E. KEMPSTER.